Jan. 1, 1929.                     1,697,439
J. H. WAGENHORST
AUTOMOBILE WHEEL RIM
Filed June 15, 1925
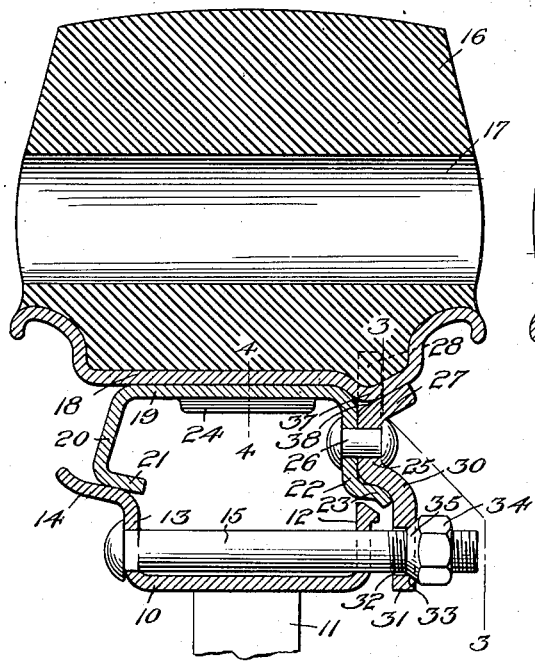
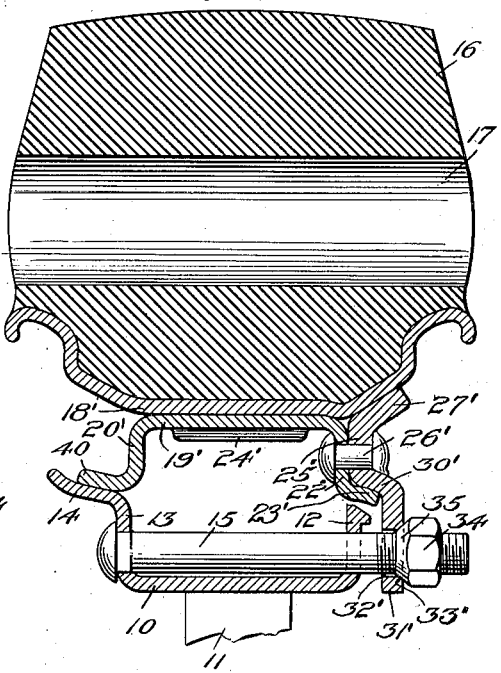
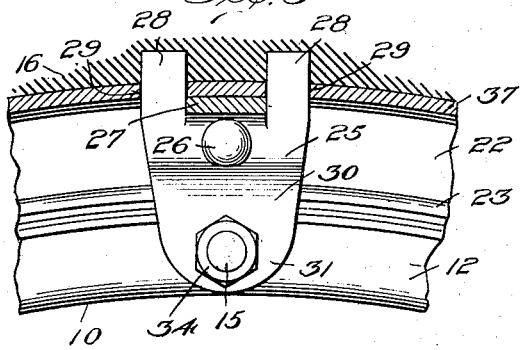
Inventor
James H. Wagenhorst
By
his Attorneys Patented Jan. 1, 1929.

1,697,439

UNITED STATES PATENT OFFICE.

JAMES H. WAGENHORST, OF JACKSON, MICHIGAN.

AUTOMOBILE WHEEL RIM.

Application filed June 15, 1925. Serial No. 37,296.

My invention relates to certain improvements in automobile wheel rims and has to do, more particularly, with a special rim construction for use in connection with certain types of rubber tires which are molded on the rim. There are on the market certain solid rubber tires, sometimes of the cellular type, which are molded on the rim. In some instances, these tires have been molded on rims designed to be demountably attached to the fixed rim of an automobile wheel. In molding these tires upon the rim, the molding takes place under pressure of from one million to two million pounds. Many of these rims and tires put on the market are so designed as to be interchangeable with pneumatic tires and rims for the corresponding type of wheel. In such case, it is necessary to maintain the outside diameter of the solid rubber tire identical with the outside diameter of the corresponding pneumatic tire and, since the solid rubber tire does not require a cross-sectional area of rubber equal to the cross-sectional area of the pneumatic tire, it is necessary to provide a spacer between the demountable rim and the fixed rim, so that the spacer and the demountable rim carrying the solid rubber tire may fit upon the same fixed rim as a demountable rim carrying a pneumatic tire.

The leading object of my present invention is to provide a demountable rim having the tire molded thereon and provided with a spacer section rigidly connected to the demountable rim and of such construction that it can be supported in the molds with the rim and will withstand the heavy crushing strains incident to the molding operation. A further object of my present invention is to provide simple, inexpensive and practical means for forming a rigid connection between the demountable rim and the spacer member. A further object is to provide novel means by which such a demountable rim and connected spacer section may be detachably maintained in seating engagement upon the fixed rim of an automobile. A further object of my invention is to provide a novel attached lug construction for securing such a demountable rim and spacer section on the fixed rim, the attached lug construction being reinforced by the spacer section. A further object of my invention is to provide a rim and spacer construction of the sort described which can be rolled from flat metal stock, thus insuring considerable saving in the cost of manufacture. A further object is to provide such a rim and spacer construction which effects a substantial reduction in weight, without any sacrifice of necessary strength.

Further objects, and objects relating to details and economies of construction and operation, will definitely appear from the detailed description following. In one instance, I accomplish the objects of my invention by the devices and means described in the following specification. My invention is clearly defined and pointed out in the appended claims.

A construction constituting a preferred embodiment of my invention is illustrated in the accompanying drawings forming a part of this specification, in which:

Figure 1 is a sectional view through a wheel, rim and tire embodying my invention;

Fig. 2 is a similar view showing a slight modification in the spacer member and the attached lug construction;

Fig. 3 is a detail view taken on the line 3—3 of Fig. 1; and

Fig. 4 is a detail sectional view taken on the line 4—4 of Fig. 1.

In the drawings, the same reference numerals refer to the same parts throughout the several figures.

In general, my invention consists in providing a demountable rim, for receiving a resilient tire molded thereto, and a spacer member rigidly connected to the base of said rim and comprising an inwardly opening channel. This channel is arranged to seat on the fixed rim of the automobile wheel. For instance, the back flange of this spacer channel may be suitably inclined to seat upon the inclined back flange of the fixed rim. Any suitable means may be provided for maintaining this demountable rim and channel spacer seated upon the fixed rim, but I propose to provide portions extending inwardly from the spacer channel and receiving securing bolts carried by the fixed rim, so that nuts screwed upon these bolts may engage such portions and hold the demountable rim and spacer channel seated in place. The portions may well take the form of lugs attached to the front leg of the spacer channel and rigidly connected with it and with the demountable rim. I propose to connect the spacer channel and the base of the demountable rim by providing a series of depressions or corrugations in each which fit one within the other, so that the rim and spacer channel are interlocked against relative movement.

Referring to the accompanying drawings, I have shown a part of a wheel comprising a fixed rim of channel cross section mounted on the ends of the spokes 11. This fixed rim may be of the usual steel felly type, comprising a base 10, a front leg 12, and a rear leg 13 having an inclined flange 14. The securing bolts 15 extend transversely through the front and rear legs of the fixed rim 10, in the usual manner. In the drawings, I have shown but one of these securing bolts, but it will be understood that as many of these bolts are provided, spaced circumferentially of the fixed rim, as may be required by the size of the wheel. The demountable rim 18 has a solid rubber tire 16 molded thereon, said rim having the usual side flanges forming a trough receiving the tire. The tire may be of the cellular type having the cells 17 formed therein.

A tire of this construction, of the dimensions shown in Figs. 1 and 2, is sufficiently resilient to be substituted for a pneumatic tire of such dimensions that, when mounted on the usual demountable rim, it will be seated upon the flange 14 of the fixed rim 10. In substituting such a solid rubber tire for a pneumatic tire, it is necessary for the manufacturer to preserve an outside diameter identical with that of the pneumatic tire and to provide a construction such that it may seat upon the usual fixed rim of the wheel without necessitating any increase in diameter of the latter, because the demountable rims carrying these solid rubber tires and the demountable rims carrying the pneumatic tires have to be interchangeable on the same wheels. It would involve undue expense to use a demountable rim of the same diameter as that ordinarily employed for pneumatic tires and take up the excess space by rubber, and, therefore, it is desirable to provide a spacer section rigidly connected to the demountable rim and arranged to seat on the fixed rim and to take up this difference in size.

I provide a spacer section comprising an inwardly opening channel having a base 19 which fits against the inner face of the base of the demountable rim 18. This spacer channel has a front wall 22 and a rear wall 20, the latter being flanged forwardly to provide the inclined flange 21 which is adapted to seat upon the flange 14 on the rear leg of the fixed rim. In order to provide a simple and an inexpensive connection between this spacer section and the demountable rim, I provide interlocking corrugations or depressions 24 and 36 which are formed in the base 19 of the channel and the base of the rim 18, respectively, and which fit one within the other. These may be formed very quickly after the spacer channel has been assembled in the rim and before the tire is molded thereon, by placing the assembled rim and spacer channel in a press and pressing down the metal at intervals to form these nested depressions.

The lower portion of the front wall of the spacer channel may be flanged forwardly at 23. A series of lugs 25 fit against the front wall of the spacer channel and are rigidly connected thereto by the rivets 26. The outer portion of each of these lugs may be bent laterally, as at 27, and engage the inclined portion 37 of the demountable rim, while tongues 28 projecting from the outer portion of each of these lugs project through openings 29 in the base of the rim 18, as shown in Fig. 3. This affords a rigid interlock between the attached lugs, the spacer channel and the demountable rim. The inner portion of each attached lug may be bent laterally outward, as at 30, so as to rest upon the forwardly flanged portion 23 of the front wall of the spacer channel, and the lug extends radially inward therefrom, as at 31, parallel to the front leg 12 of the fixed rim, but spaced therefrom. Each of these attached lugs has a bolt hole 32, greater in diameter than the securing bolt 13, so as to provide a clearance, and has a countersink 33 at its front end forming a conical recess to be engaged by the conical face 35 of the nut 34 screwed upon the securing bolt 15. There will be as many of these attached lugs 25 as there are securing bolts on the wheel, so arranged that when the demountable rim and spacer channel are properly assembled on the wheel the securing bolts 15 will project through the bolt holes of the attached lugs. As the nuts 34 are screwed up the spacer channel flange 21 is brought to seating engagement on the flange 14 of the fixed rim, so that the demountable rim, tire and spacer channel are maintained by these nuts seated upon the fixed rim.

The construction shown in Fig. 2 is essentially the same as that of Fig. 1, but the rear wall 20' of the spacer channel is flanged rearwardly at 40 to provide an inclined surface seating on the flange 14' of the fixed rim. This provides a construction which effects some saving in material as the spacer channel may be made somewhat narrower than in the form shown in Fig. 1. In the construction shown in Fig. 2, the tongues 28 are omitted and the attached lug 25' merely has the inclined outer portion 27' contacting with the face of the rim 18'.

The construction which I have described has considerable advantages in connection with the manufacture of rims of the type for use with a tire molded on the rim. The demountable rim 18 and the spacing channel and attached lugs may be assembled together and rigidly connected by the depressions 36 and 24, the rivets 26, and the tongues 28 and 27 on the attached lugs. After this has been done, the rubber tire 16 may be molded upon the rim and, during this operation, a mandrel may be inserted within the inwardly opening channel 19 engaging the inner face of the base thereof, so that adequate support may be provided for the rim and the spacer channel to withstand the very great crushing strains to which they are necessarily subjected in the molding operation. In this way, these crushing strains may be transmitted from the base of the rim 18 to the base of the channel 19 and are exerted upon the two metal surfaces, which are in contact with each other, in a direction transverse to the thickness of the metal, so that the metal is disposed in the best possible manner to withstand such strains.

This construction is one which may be manufactured very cheaply, as all the parts may be made from flat metal stock and can be manufactured by rolling operations and assembled quickly and cheaply. The attached lugs provide a simple and cheap construction for detachably securing such a demountable rim and spacer channel on the fixed rim, and these lugs may be attached to the rim and spacer channel before the tire is molded thereon.

I am aware that the construction disclosed herein may be changed in numerous particulars without departing from the spirit of my invention and, therefore, I claim my invention broadly, as indicated by the appended claims.

Having thus described my invention, what I claim as new and useful and desire to secure by Letters Patent, is:

1. The combination of a demountable tire-carrying rim, an inwardly-opening, channel spacer rigidly connected to said rim, the inner portions of the front wall of said spacer being flanged forwardly, and a plurality of lugs attached to said spacer and engaging the forwardly flanged portions of said front wall, said lugs being apertured to receive securing bolts.

2. The combination of a demountable tire-carrying rim, an inwardly-opening, channel spacer rigidly connected to said rim, and a plurality of lugs attached to the front wall of said spacer and apertured to receive securing bolts, the outer portions of said lugs being flanged forwardly and outwardly and engaging portions of the rim base.

3. The combination of a demountable tire-carrying rim, an inwardly-opening, channel spacer rigidly connected to said rim, and a plurality of lugs attached to the front wall of said spacer and apertured to receive securing bolts, said lugs having tongues extending through openings in the base of the rim.

4. The combination of a demountable rim having a circumferential rib formed therein and an inwardly opening channel spacer engaging the base of said demountable rim and held against lateral movement in one direction by engagement with said rib, said rim base and spacer having interlocking depressions formed therein to prevent circumferential movement of one relative to the other.

JAMES H. WAGENHORST.